United States Patent
Shinohara et al.

(10) Patent No.: US 9,252,449 B2
(45) Date of Patent: Feb. 2, 2016

(54) SOFC STACK WITH TEMPERATURE ADAPTED COMPRESSION FORCE MEANS

(75) Inventors: Masashi Shinohara, Saitama (JP); Hideo Urata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 14/131,758

(22) PCT Filed: Jun. 26, 2012

(86) PCT No.: PCT/JP2012/066828
§ 371 (c)(1),
(2), (4) Date: Jan. 9, 2014

(87) PCT Pub. No.: WO2013/008654
PCT Pub. Date: Jan. 17, 2013

(65) Prior Publication Data
US 2014/0134515 A1    May 15, 2014

(30) Foreign Application Priority Data
Jul. 13, 2011    (JP) .................................. 2011-155007

(51) Int. Cl.
*H01M 8/12*    (2006.01)
*H01M 8/24*    (2006.01)

(52) U.S. Cl.
CPC .............. *H01M 8/2425* (2013.01); *H01M 8/12* (2013.01); *H01M 8/248* (2013.01); *H01M 8/249* (2013.01); *H01M 8/2475* (2013.01); *Y02E 60/521* (2013.01); *Y02E 60/525* (2013.01)

(58) Field of Classification Search
CPC . H01M 8/2425; H01M 8/2475; H01M 8/248; H01M 8/249; Y02E 60/521; Y02E 60/525
See application file for complete search history.

(56) References Cited

U.S. PATENT DOCUMENTS

| | | | |
|---|---|---|---|
| 5,418,194 A * | 5/1995 | Dawes et al. .................... | 501/52 |
| 2008/0182152 A1* | 7/2008 | Erikstrup ......................... | 429/34 |

FOREIGN PATENT DOCUMENTS

| | | | | |
|---|---|---|---|---|
| EP | 2 109 912 B1 | 5/2010 | | |
| JP | 2003-086232 | 3/2003 | | |
| JP | 2005-079024 | 3/2005 | | |
| JP | 2007-179935 | 7/2007 | | |
| WO | WO 2011/025569 | * | 3/2011 | ................ B32B 3/26 |
| WO | WO 2011/157351 | * | 12/2011 | .............. H01M 8/24 |

* cited by examiner

*Primary Examiner* — Patrick Ryan
*Assistant Examiner* — Aaron Greso
(74) *Attorney, Agent, or Firm* — Rankin, Hill & Clark LLP

(57) ABSTRACT

A fuel cell stack includes a stack body formed by stacking a plurality of solid oxide fuel cells in a stacking direction. The fuel cell stack includes wall plate members and fuel cell support members. The wall plate members are provided in the stacking direction of the stack body around the sides of the stack body. Each of the fuel cell support members includes a composite layer made of composite material of alumina fiber and vermiculite. The fuel cell support members are interposed between the wall plate members and the sides of the stack body, and apply a load to the sides of the stack body in directions of a separator surface.

4 Claims, 13 Drawing Sheets

US 9,252,449 B2

SOFC STACK WITH TEMPERATURE ADAPTED COMPRESSION FORCE MEANS

TECHNICAL FIELD

The present invention relates to a fuel cell stack including a stack body formed by stacking a plurality of solid oxide fuel cells. Each of the solid oxide fuel cells is formed by stacking an electrolyte electrode assembly between separators. The electrolyte electrode assembly includes an anode, a cathode, and an electrolyte interposed between the anode and the cathode.

BACKGROUND ART

Typically, solid oxide fuel cells (SOFC) employ an electrolyte of ion-conductive oxide such as stabilized zirconia. The electrolyte is interposed between an anode and a cathode to form an electrolyte electrode assembly (MEA). The electrolyte electrode assembly is interposed between a pair of separators (bipolar plates). In use, generally, a predetermined numbers of the separators and the electrolyte electrode assemblies are stacked together to form a fuel cell stack.

In the fuel cell stack of this type, when flat plate stack type solid oxide fuel cells are used, it is required to reliably position the fuel cells relative to each other in the stacking direction. For this purpose, in a fuel cell stack disclosed in Japanese Laid-Open Patent Publication No. 2003-086232 (hereinafter referred to as the conventional technique 1), as shown in FIG. 11, end plates 1a are provided at both ends of the fuel cell stack in the stacking direction. Insulating plates 2a and current collection plates 3a are provided inside the end plates 1a, and a stack body formed by stacking MEAs 4a and separators 5a alternately is sandwiched between the current collection plates 3a.

At the time of producing the fuel cell stack, components of the fuel cell stack are stacked successively such that end surfaces of respective components of the fuel cell stack are aligned to a plurality of positioning guides 7a of an assembling jig 6a. Then, a pair of end plates 1a are fixed together using bolts (not shown) to apply a tightening load to the fuel cell stack in the stacking direction.

Further, in a method of assembling a fuel cell disclosed in Japanese Laid-Open Patent Publication No. 2005-079024 (hereinafter referred to as the conventional technique 2), as shown in FIG. 12, pin holes 2b are formed at four corners and intermediate portions in respective sides of a separator 1b as a component of the fuel cell. Then, pins 3b provided in a jig (not shown) are inserted into the pin holes 2b to position the separator 1b.

Further, as shown in FIG. 13, a fuel cell disclosed in Japanese Laid-Open Patent Publication No. 2007-179935 (hereafter referred to as the conventional technique 3) includes a stack 1c formed by stacking stack components including rectangular cells. A first cutout portion 2c extending in the stacking direction of cells is formed in a first side wall of the stack 1c, and a second cutout portion 3c extending in the stacking direction of the cells is formed in a second side wall of the stack 1c opposite to the first side wall. As viewed from a direction perpendicular to the first side wall, the first cutout portion 2c and the second cutout portion 3c are not overlapped with each other.

Cylindrical guide shafts (not shown) contact the first cutout portion 2c and the second cutout portion 3c of the end plate to position the end plate. Then, an insulator is stacked on the end plate. Then, a terminal is provided on the insulator, unit cells are provided on the terminal, another terminal is provided on the unit cells, another insulator is provided on the terminal, and another end plate is provided on the insulator successively in the same manner.

SUMMARY OF INVENTION

In the conventional technique 1, since the components are positioned by the plurality of positioning guides 7a provided in the assembling jig 6a, the positioning guides 7a need to be fabricated with a high degree of accuracy. Therefore, the production cost of the assembling jig 6a is high. Further, after assembling operation is finished, the fuel cell stack is removed from the assembling jig 6a. Therefore, positional deviation tends to occur in the fuel cell stack during transportation of the fuel cell stack.

In the conventional technique 2, the pins 3b are inserted into the pin holes 2b of the separator 1b. In this regard, since operating temperature of the solid oxide fuel cell (SOFC) is relatively high, the pins 3b tend to be expanded or distorted. Further, the pins 3b tend to be damaged undesirably during transportation of the fuel cells.

Further, in the conventional technique 3, the first cutout portion 2c and the second cutout portion 3c need to be formed in the first side wall and the second side wall of the stack components with a high degree of accuracy. Therefore, the production cost of the stack components is considerably high.

The present invention has been made to solve the problems of this type, and an object of the present invention is to provide a fuel cell stack having simple and compact structure in which it is possible to assemble the fuel cell stack easily, and positional displacement or the like during transportation is suppressed suitably.

The present invention relates to a fuel cell stack including a stack body formed by stacking a plurality of solid oxide fuel cells in a stacking direction. Each of the solid oxide fuel cells is formed by stacking an electrolyte electrode assembly between separators. The electrolyte electrode assembly includes an anode, a cathode, and an electrolyte interposed between the anode and the cathode.

The fuel cell stack includes a wall and a fuel cell support member. The wall is provided in the stacking direction of the stack body around a side of the stack body. The fuel cell support member is made of composite material of alumina fiber and vermiculite. The fuel cell support member is interposed between the wall and the side of the stack body to apply a load to the side of the stack body in a direction of a separator surface.

According to the present invention, the alumina fiber is elastic, and has good durability at high temperature, good heat insulating property and good electrically insulating property. Vermiculite has a high expansion coefficient at high temperature. Thus, the composite layer has good heat resistance property, good heat insulating property, and good heat expansion property. The composite layer can follow the change in the temperature of the fuel cell stack easily, making it possible to suitably suppress the positional displacement of the stack body in the directions of the separator surface.

Further, heat radiation from the fuel cell stack is suitably suppressed, and thermally self-sustaining operation can be facilitated. The thermally self-sustaining operation herein means suitable operation of the fuel cell only using the heat generated by the fuel cell itself, without requiring any heat supplied from the outside.

With simple and compact structure, it becomes possible to assemble the fuel cell stack easily, suppress positional displacement or the like during transportation of the fuel cell stack, and suppress heat radiation. Thus, the fuel cell stack which can be operated highly efficiently is provided.

Moreover, positioning pins or guides for positioning components are not required. Thus, assembling operation can be performed without requiring a high degree of positioning accuracy, and the number of steps for assembling operation can be reduced effectively.

DESCRIPTION OF EMBODIMENTS

Figure 1:
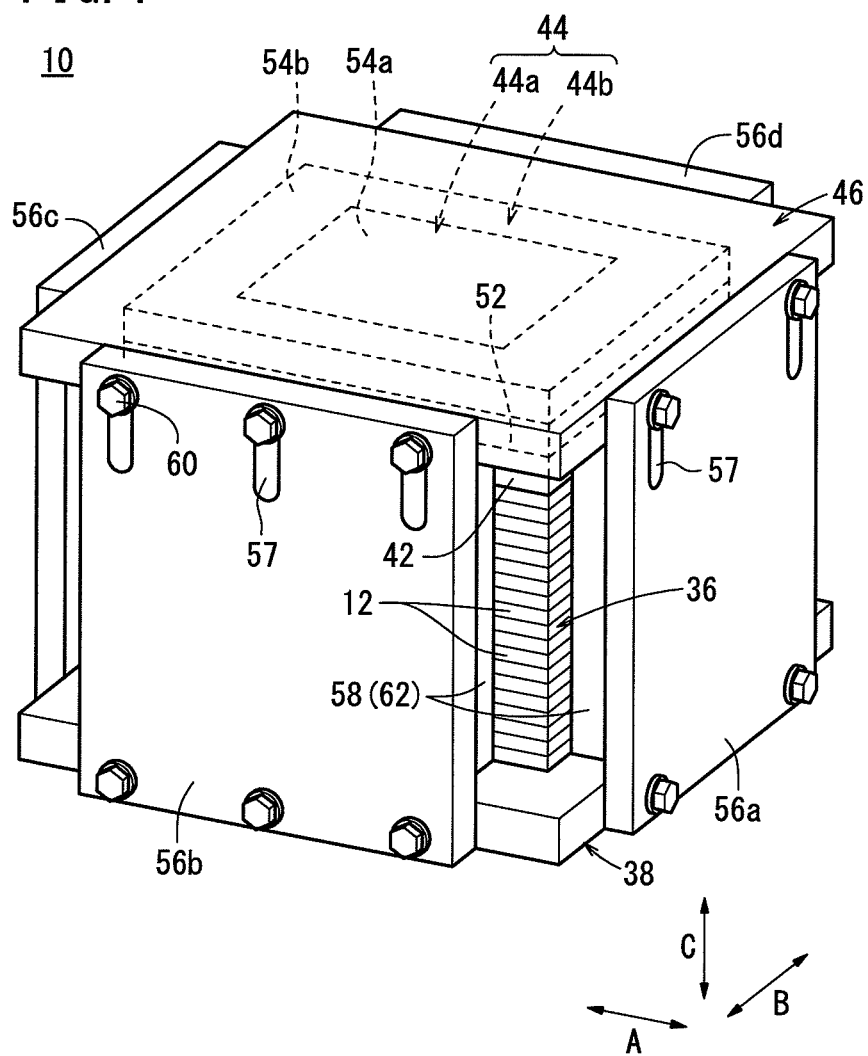
FIG. 1 is a perspective view schematically showing a fuel cell stack according to a first embodiment of the present invention.
Figure 2:
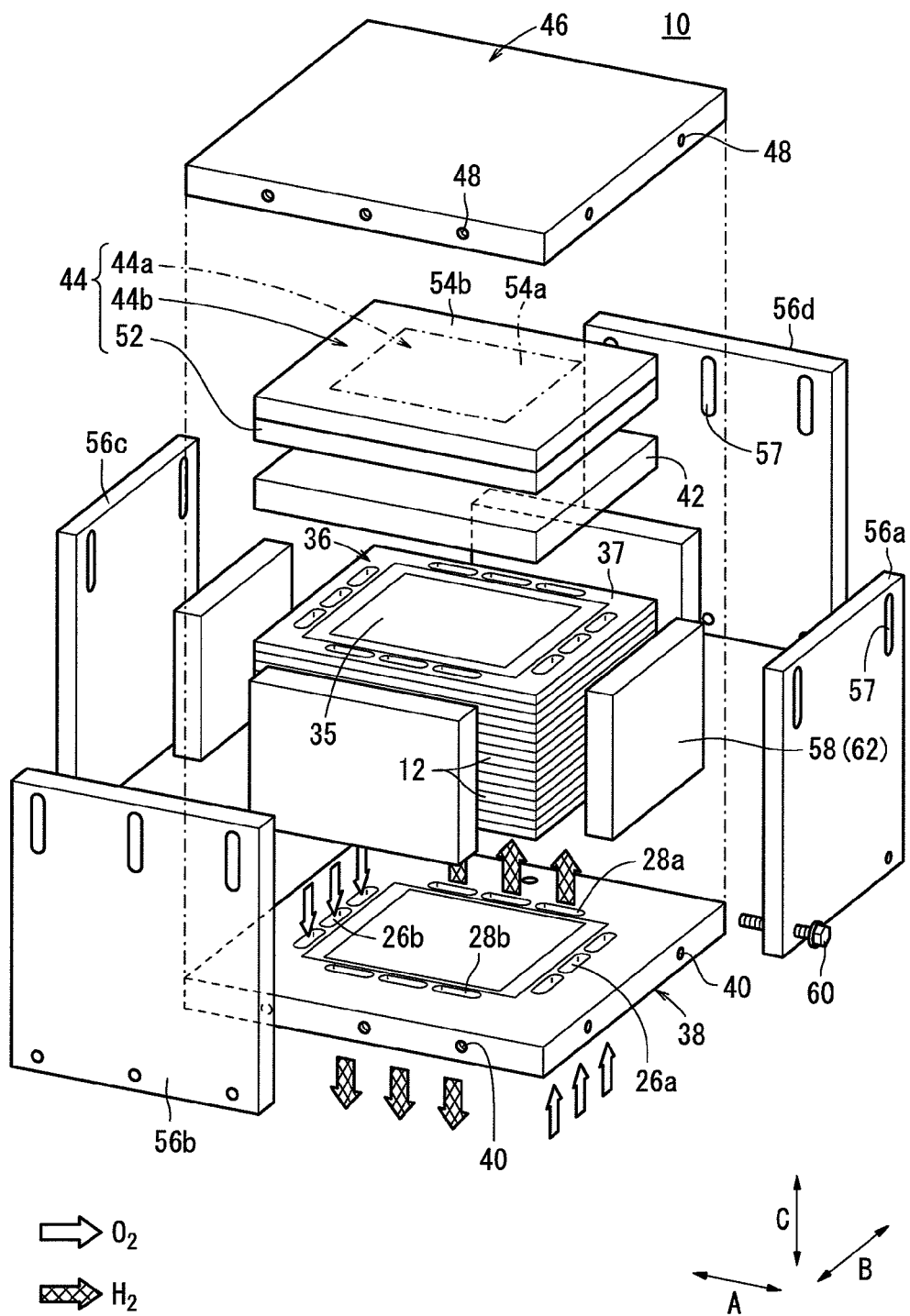
FIG. 2 is a partially-exploded perspective view showing the fuel cell stack.

As shown in FIGS. 1 and 2, a fuel cell stack 10 according to a first embodiment of the present invention is formed by stacking a plurality of solid oxide fuel cells 12 in a vertical direction indicated by an arrow D or in a horizontal direction indicated by an arrow A. The fuel cell stack 10 is used in various applications, including stationary and mobile applications. For example, the fuel cell stack 10 is mounted on a vehicle. The solid oxide fuel cell 12 performs power generation by electrochemical reactions of a fuel gas (hydrogen-containing gas such as a mixed gas of hydrogen gas, methane, and carbon monoxide) and an oxygen-containing gas (air).

Figure 3:
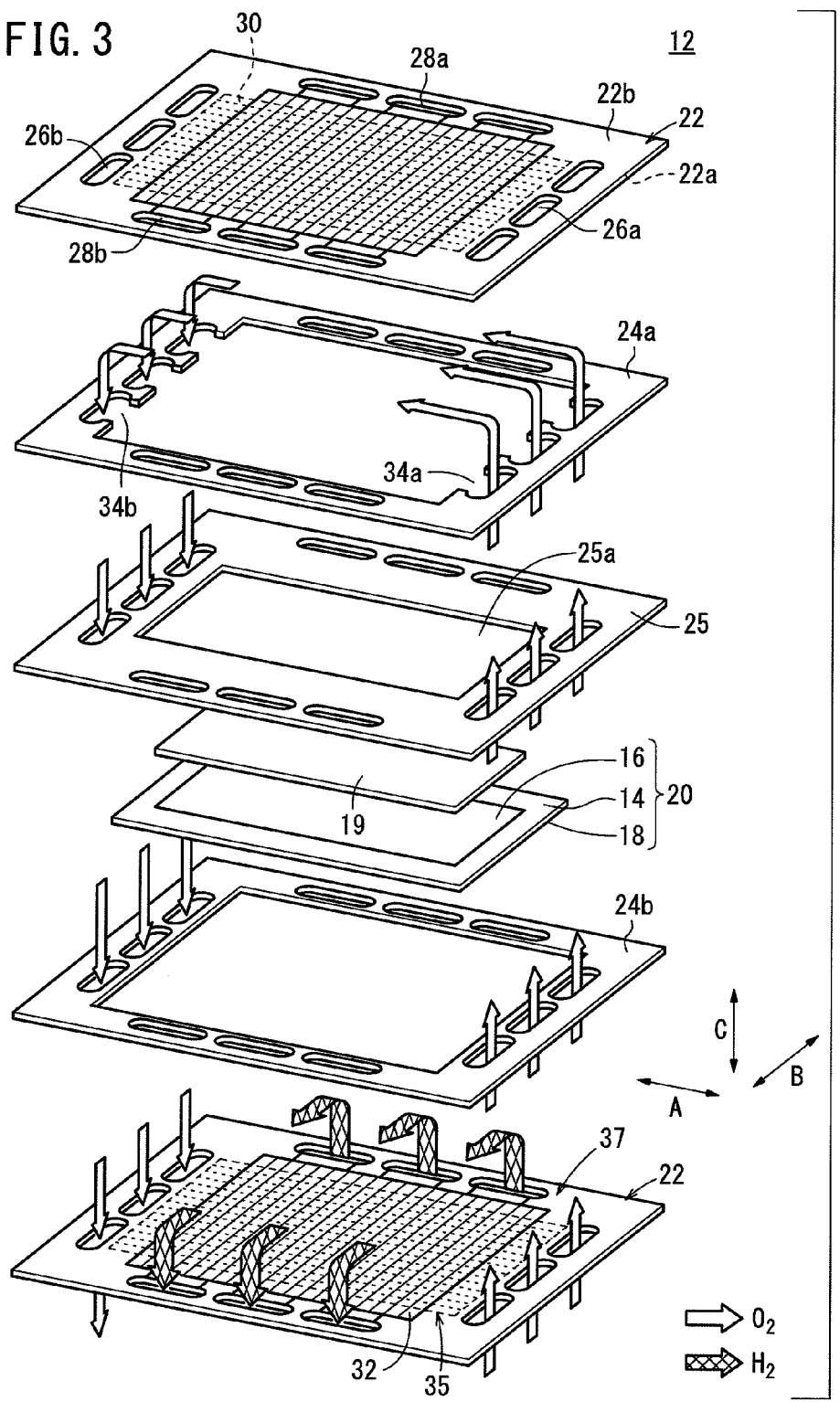
FIG. 3 is an exploded perspective view showing a solid oxide fuel cell of the fuel cell stack.

As shown in FIG. 3, a solid oxide fuel cell 12 includes electrolyte electrode assemblies 20. Each of the electrolyte electrode assembly (MEA) 20 includes a cathode 16, an anode 18, and an electrolyte (electrolyte plate) 14 interposed between the cathode 16 and the anode 18. For example, the electrolyte 14 is made of ion-conductive oxide such as stabilized zirconia.

The electrolyte electrode assembly 20 is an anode support type cell in which the thickness of the anode 18 is larger than the thickness of the cathode 16 and the electrolyte 14. The surface area of the cathode 16 is smaller than the surface area of the electrolyte 14.

Alternatively, instead of adopting the anode support type cell as the electrolyte electrode assembly 20, it is possible to adopt an electrolyte support type cell in which thickness of the electrolyte 14 is larger than the thickness of the anode 18 and the cathode 16. At least the surface area of the anode 18 or the surface area of the cathode 16 may be smaller than the surface area of the electrolyte 14.

A current collector 19 is stacked on the cathode 16. The current collector 19 has substantially the same size as the cathode 16. For example, the current collector 19 is in the form of foamed metal or metal mesh containing metal such as nickel.

The electrolyte electrode assembly 20 has a rectangular shape or a square shape, and a barrier layer (not shown) is provided at least at the outer edge of the electrolyte electrode assembly 20 for preventing the entry or discharge of the oxygen-containing gas and the fuel gas.

The solid oxide fuel cell 12 includes a single electrolyte electrode assembly 20 sandwiched between a pair of separators (interconnectors) 22. Further, seal members 24a, 24b and a metal plate 25 are interposed between the separators 22 and the electrolyte electrode assembly 20. For example, each of the separators 22 is a metal plate of, e.g., stainless alloy. For example, mica material, ceramic material or the like, i.e., crustal component material, glass material, and composite material of clay and plastic may be used for the seal members 24a, 24b.

The metal plate 25 has a frame shape. An opening 25a formed inside the metal plate 25 is larger than the cathode 16, and smaller than the electrolyte 14. A wall around the opening 25a of the metal plate 25 is stacked on a portion around the electrolyte 14 to have a gas sealing function between the cathode 16 and the anode 18.

The separator 22 has a rectangular shape or a square shape. At one end of the separator 22 in a longitudinal direction indicated by an arrow A, a plurality of, e.g., three oxygen-containing gas supply passages 26a are arranged in a lateral direction indicated by an arrow B. At the other end of the separator 22 in the longitudinal direction indicated by the arrow A, a plurality of, e.g., three oxygen-containing gas discharge passages 26b are arranged in the direction indicated by the arrow B.

At one end of the separator 22 in the lateral direction indicated by the arrow B, for example, three fuel gas supply passages 28a are arranged in the direction indicated by the arrow A. At the other end of the separator 22 in the lateral direction, for example, three fuel gas discharge passages 28b are arranged in the direction indicated by the arrow A.

Conversely to the above described structure, three fuel gas supply passages 28a and three fuel gas discharge passages 28b may be provided on both sides in the longitudinal direction of the separator 22, and three oxygen-containing gas supply passages 26a and three oxygen-containing gas discharge passages 26b may be provided on both sides in the lateral direction of the separator 22.

The separator 22 has an oxygen-containing gas channel 30 on its surface 22a facing the cathode 16 of the electrolyte electrode assembly 20 for supplying the oxygen-containing gas along the electrode surface of the cathode 16. The oxygen-containing gas channel 30 includes a plurality of flow grooves extending in the direction indicated by the arrow A. Both ends of the oxygen-containing gas channel 30 are terminated adjacent to the oxygen-containing gas supply passages 26a and the oxygen-containing gas discharge passages 26b.

The separator 22 has a fuel gas channel 32 on its surface 22b facing the anode 18 of the electrolyte electrode assembly 20 for supplying a fuel gas along the electrode surface of the anode 18.

The fuel gas channel 32 includes a plurality of flow grooves extending in the direction indicated by the arrow B. Both ends of the fuel gas channel 32 are connected to the fuel gas supply passages 28a and the fuel gas discharge passages 28b.

The oxygen-containing gas supply passages 26a, the oxygen-containing gas discharge passages 26b, the fuel gas supply passages 28a, and the fuel gas discharge passages 28b are formed in the seal members 24a, 24b. Inlet connection channels 34a for connecting the oxygen-containing gas supply passage 26a and the oxygen-containing gas channel 30 and outlet connection channels 34b for connecting the oxygen-containing gas discharge passage 26b and the oxygen-containing gas channel 30 are formed in the seal member 24a, 24b.

The electrolyte electrode assembly 20 is sandwiched between the separators 22. Each of the separators 22 includes a sandwiching section 35 and a reactant gas supply section 37. The fuel gas channel 32 and the oxygen-containing gas channel 30 are provided separately on the sandwiching section 35. The oxygen-containing gas supply passage 26a, the oxygen-containing gas discharge passage 26b, the fuel gas supply passage 28a, and the fuel gas discharge passage 28b extend through the reactant gas supply section 37 in the stacking direction.

As shown in FIGS. 1 and 2, a plurality of the solid oxide fuel cells 12 are stacked together in the direction indicated by the arrow C to form a stack body 36. The stack body 36 is placed on a lower end plate (base member) 38 positioned at a lower end (one end) of the stack body 36 in the stacking direction indicated by the arrow C.

The dimensions of the lower end plate 38 in the directions indicated by the arrows A and B are larger than the dimensions of the stack body 36 in the directions indicated by the arrows A and B. The oxygen-containing gas supply passages 26a, the oxygen-containing gas discharge passages 26b, the fuel gas supply passages 28a, and the fuel gas discharge passages 28b are formed in the lower end plate (see FIG. 2).

A plurality of screw holes 40 are formed on each end face (end face along the thickness direction) of the lower end plate 38. Though not shown, manifolds for supplying and discharging the oxygen-containing gas and the fuel gas are attached to the lower end plate 38.

An upper end plate 42 is provided at an upper end (other end) of the stack body 36 in the stacking direction. The dimensions of the upper end plate 42 in the directions indicated by the arrows A and B are the same as the dimensions of the stack body 36 in the directions indicated by the arrows A and B. The upper end plate 42 is a flat rectangular or square plate.

A fuel cell support member 44 and a load plate (mounting member) 46 are stacked on the upper end plate 42. Holes 48 are formed on each end face of the load plate 46.

The fuel cell support member 44 includes a first support section 44a for applying a load to the sandwiching section 35 in the stacking direction at a position corresponding to the electrolyte electrode assemblies 20, and a second support section 44b for applying a load to the reactant gas supply sections 37 in the stacking direction. The density of the first support section 44a is smaller than the density of the second support section 44b.

Specifically, the fuel cell support member 44 includes an alumina layer 52 and a first composite layer 54a of the first support section 44a, and a second composite layer 54b of the second support section 44b. The first composite layer 54a and the second composite layer 54b are combined together to form a rectangular shape as a whole. At the center of the rectangular fuel cell support member 44, the first composite layer 54a corresponding to the shape of the electrolyte electrode assembly 20 is provided, and the second composite layer 54b having a frame shape corresponding to the reactant gas supply section 37 is provided around the first composite layer 54a.

The alumina layer 52 includes alumina fiber. Specifically, the alumina layer 52 is formed by impregnating crystalline alumina fiber with an organic binder for compression in the thickness direction, and removing solvent portion of the organic binder by drying. The alumina layer 52 containing the alumina fiber has elasticity, good durability at high temperature and heat insulating property and electrically insulating property.

Each of the first composite layer 54a and the second composite layer 54b is made of composite material of alumina fiber and vermiculite. Specifically, each of the first composite layer 54a and the second composite layer 54b is formed by dispersing vermiculite particles into slurry containing crystalline alumina fiber, and produced in the same manner as the above alumina layer 52. The amount of vermiculite contained in the first composite layer 54a is smaller than the amount of vermiculite contained in the second composite layer 54b. The first composite layer 54a and the second composite layer 54b may be provided separately.

Wall plate members (walls) 56a to 56d are provided in the stacking direction of the stack body 36 around the sides of the stack body 36. Fuel cell support members 58 are interposed between the sides of the stack body 36 and the wall plate members 56a to 56d. Opposite ends of the wall plate members 56a to 56d in the direction indicated by the arrow C are fixed to the lower end plate 38 and the load plate 46 by bolts 60 screwed into the screw holes 40 of the lower end plate 38 and screw holes 48 of the load plate 46. The wall plate members 56a to 56d have long holes 57 for adjusting the load plate 46 in the stacking direction.

The fuel cell support member 58 at least includes a composite layer 62. As necessary, an alumina layer may be provided on a surface of the composite layer 62 facing the stack body 36, and further an insulating member (described later) may be provided between the alumina layer and the stack body 36. The composite layer 62 is made of composite material of alumina fiber and vermiculite. Specifically, the composite layer 62 is formed by dispersing vermiculite particles into slurry containing crystalline alumina fiber, and produced in the same manner as the above alumina layer 52.

At the time of assembling the fuel cell stack 10, after the stack body 36 is stacked on the lower end plate 38, the upper end plate 42 is stacked on the stack body 36. After the alumina layer 52 having a predetermined thickness and the first and second composite layers 54a, 54b each having a predetermined thickness are placed on the upper end plate 42, the load plate 46 is provided on the first and second composite layers 54a, 54b.

Then, the composite layers 62 are provided on the respective sides of the stack body 36, and the wall plate members 56a to 56d are provided to press the composite layers 62 against the sides of the stack body 36. The wall plate members 56a to 56d are fixed to the lower end plate 38 and the load plate 46 by the bolts 60 screwed into the screw holes 40 of the lower end plate 38 and the screw holes 48 of the load plate 46.

A load in the stacking direction is applied to the stack body 36 through the fuel cell support member 44, and a position support function in the direction of the separator surface is realized by the fuel cell support members 58.

Operation of the fuel cell stack 10 will be described below.

As shown in FIG. 2, a fuel gas (e.g., hydrogen gas) and an oxygen-containing gas (e.g., air) are supplied to the lower end plate 38 of the fuel cell stack 10 through the manifolds (not shown). The air flows vertically upward along the oxygen-containing gas supply passages 26a.

In each of the solid oxide fuel cells 12, as shown in FIG. 3, the air flows through the inlet connection channels 34a of the seal member 24a connected to the oxygen-containing gas supply passages 26a, and then, the air is supplied to the oxygen-containing gas channel 30 of the separator 22. The air flows through the oxygen-containing gas channel 30 in the direction indicated by the arrow A, and the air is supplied to the cathode 16 of the electrolyte electrode assembly 20. Then, the air is discharged into the oxygen-containing gas discharge passage 26b.

The fuel gas flows vertically upward along the fuel gas supply passages 28a, and the fuel gas is supplied to the fuel gas channel 32 of the separator 22 of each solid oxide fuel cell 12. The fuel gas flows in the direction indicated by the arrow B along the fuel gas channel 32, and the fuel gas is supplied to the anode 18 of the electrolyte electrode assembly 20. Then, the fuel gas is discharged to the fuel gas discharge passage 28b.

Thus, in the electrolyte electrode assembly 20, the fuel gas is supplied to the anode 18, and the air is supplied to the cathode 16. Thus, oxide ions flow through the electrolyte 14 toward the anode 18 for generating electricity by electrochemical reactions.

In the first embodiment, the composite layers 62 are provided on the respective sides of the stack body 36, and the wall plate members 56a to 56d are provided to press the composite layers 62 against the sides of the stack body 36.

The composite layer 62 includes alumina fiber with elasticity, having good durability at high temperature, good heat insulating property, and good electrical insulating property. Further, the composite layer 62 includes vermiculite having a high heat expansion coefficient at high temperature. Thus, the composite layer 62 has good heat insulating property, good electrically insulating property, and good heat expansion property. The composite layer 62 can follow the change in the temperature of the fuel cell stack 10 easily, making it possible to suitably suppress the occurrence of the positional displacement of the stack body 36 in the directions of the separator surface (in the directions indicated by the arrow A and the arrow B).

Further, the sides of the stack body 36 are supported by the composite layers 62 of the fuel cell support members 58. In the structure, it becomes possible to prevent the occurrence of positional displacement of the stack body 36 in the directions of the separator surface during transportation of the fuel cell stack 10.

Further, heat radiation from the fuel cell stack 10 is suitably suppressed, and thermally self-sustaining operation can be facilitated. The thermally self-sustaining operation herein means suitable operation of the fuel cell only using the heat generated by the fuel cell, without requiring any heat supplied from the outside.

With simple and compact structure, it becomes possible to assemble the fuel cell stack 10 easily, suppress positional displacement or the like during transportation of the fuel cell stack 10, and suppress heat radiation. Thus, the fuel cell stack 10 which can be operated highly efficiently is provided.

Moreover, positioning pins or guides for positioning components are not required. Thus, assembling operation can be performed without requiring a high degree of positioning accuracy, and the number of steps for assembling operation can be reduced effectively.

Figure 4:
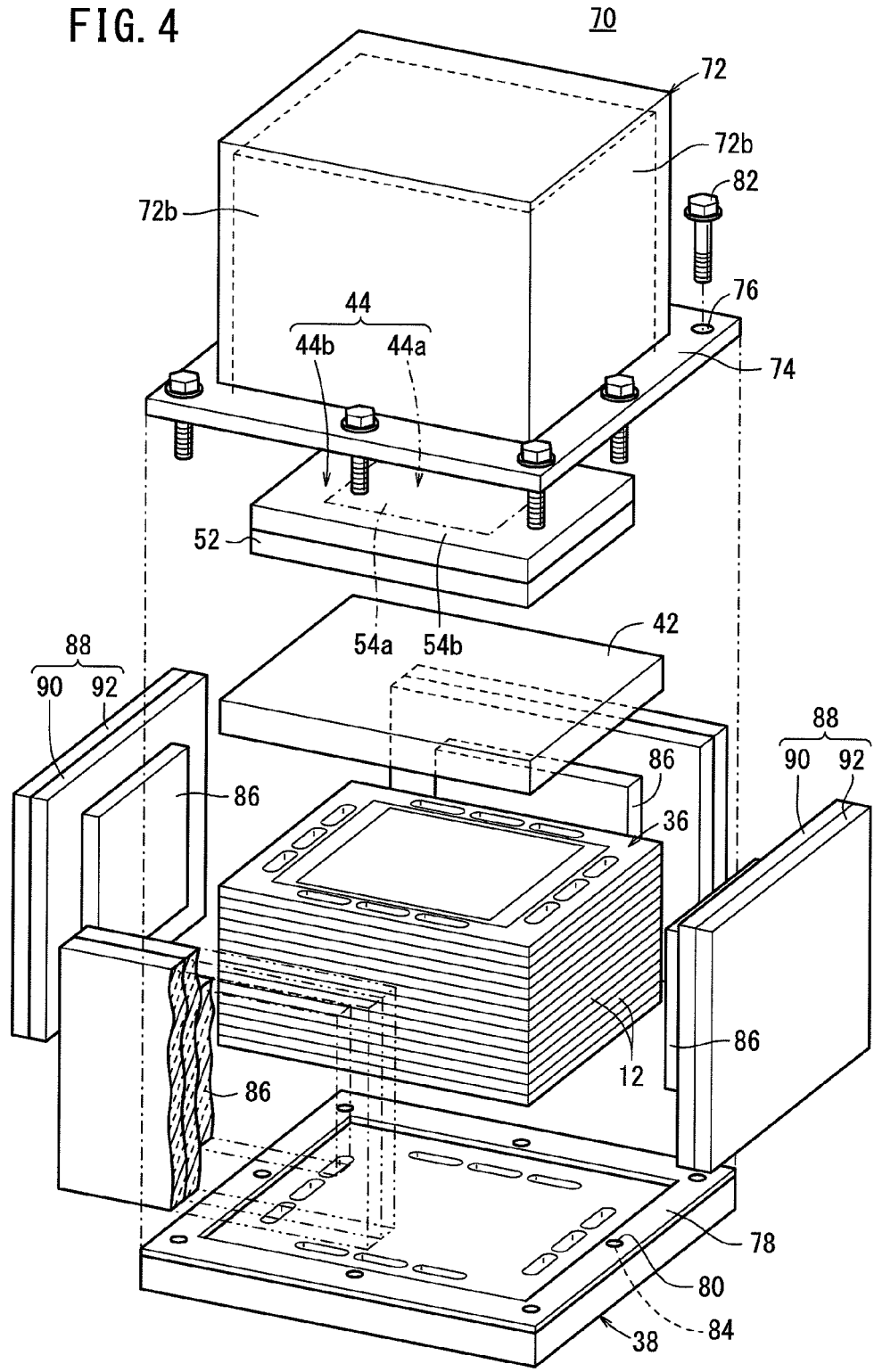
FIG. 4 is a partially-exploded perspective view showing a fuel cell stack according to a second embodiment of the present invention.

FIG. 4 is a partial exploded perspective view showing a fuel cell stack 70 according to a second embodiment of the present invention.

The constituent elements that are identical to those of the fuel cell stack 10 according to the first embodiment are labeled with the same reference numeral, and description thereof will be omitted. Also in a third embodiment as described later, the constituent elements that are identical to those of the fuel cell stack 10 according to the first embodiment are labeled with the same reference numeral, and description thereof will be omitted. In second and other embodiments described later, boxes are used as the mounting members. However, the present invention is not limited in this respect. The load plate 46 and the wall plate members 56a to 56d according to the first embodiment may be adopted also in the second and other embodiments.

Figure 5:
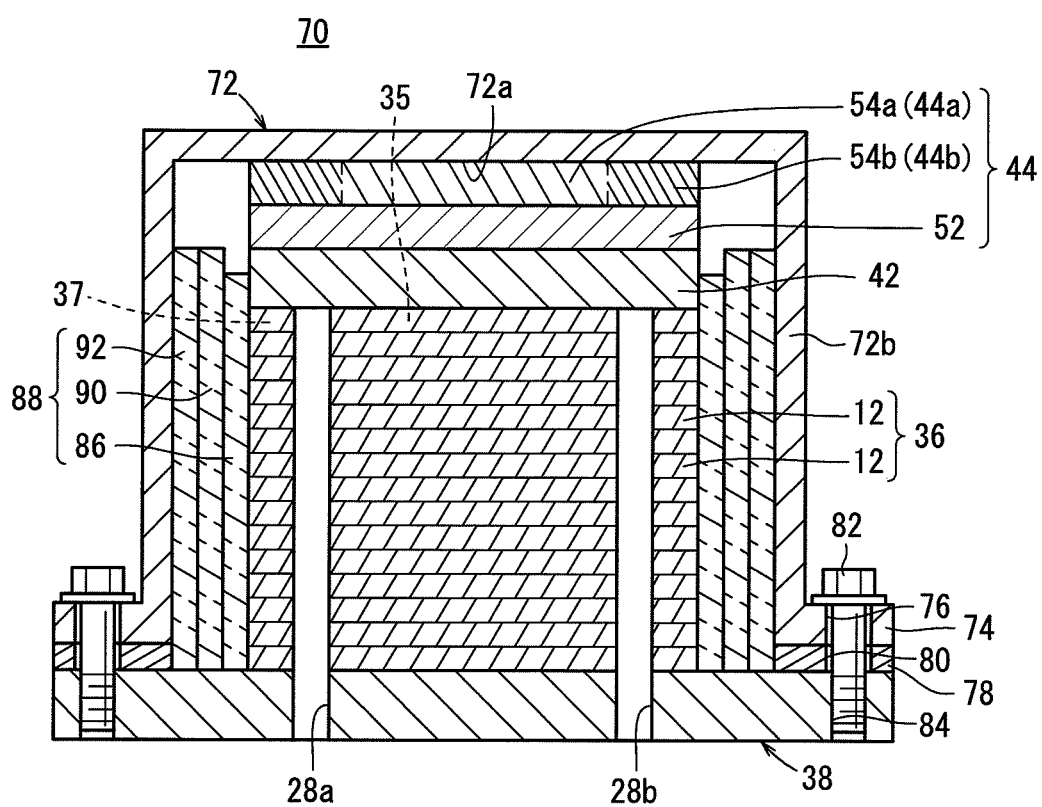
FIG. 5 is a cross sectional view schematically showing the fuel cell stack.

In the fuel cell stack 70, as shown in FIGS. 4 and 5, instead of the load plate 46, a box 72 is provided. For example, the box 72 is made of ferrite based stainless. A flange 74 protruding toward outwardly is provided at an opening end of the box 72. A plurality of holes 76 are formed in the flange 74.

The stack body 36 is placed on the lower end plate 38 through a seal member 78. The seal member 78 has a frame shape, and a plurality of holes 80 are formed in the seal member 78 coaxially with the holes 76.

Bolts 82 are inserted into the holes 76, 80, and screwed into screw holes 84 of the lower end plate 38. Thus, a bottom (mounting member) 72a of the box 72 presses the fuel cell support member 44 in the stacking direction. In the box 72, insulating members such as insulating plates 86 made of mica or the like and the fuel cell support members 88 are provided along the sides of the stack body 36.

The insulating plates 86 are interposed between the stack body 36 and the fuel cell support members 88, and each of the fuel cell support members 88 includes an alumina layer 90 and a composite layer 92. The alumina layer 90 has the same structure as the alumina layer 52 described above. The composite layer 92 is made of composite material of alumina fiber and vermiculite, and has the same structure as the first composite layer 54a (54b) described above. The alumina layers 90 are provided adjacent to the sides of the stack body 36, and the composite layers 92 are provided adjacent to the sides of the wall surfaces (walls) 72b of the box 72. For example, alumina fiber may fill the space in the box 72.

In the second embodiment, each of the fuel cell support members 88 includes the alumina layer 90 of alumina fiber and the composite layer 92 of composite material. The alumina layers 90 are provided adjacent to the sides of the stack body 36, and the composite layers 92 are provided adjacent to the wall surfaces 72b.

The alumina fiber is elastic, and has good heat durability at high temperature. Further, alumina fiber has good heat insulating property and good electrical insulating property. Therefore, the alumina layer 90 can be suitably provided at the sides of the stack body 36 operated at high temperature.

Though vermiculite has poor durability at high temperature in comparison with alumina fiber, vermiculite has a high heat expansion coefficient at high temperature. Therefore, by providing the composite layers 92 adjacent to the wall surfaces 72b, vermiculite is not directly exposed to the hot stack body 36. Further, thanks to heat expansion of vermiculite, it is possible to suppress positional displacement of the stack body 36 in directions of the separator surface suitably.

Further, in the second embodiment, insulating plates 86 are provided between the fuel cell support members 88 and the stack body 36. Thus, an insulating function and a positioning function in the directions along the separator surface of the stack body 36 are realized by the insulating plates 86. Thus, operation of positioning the stack body 36 is further simplified advantageously.

In particular, the alumina layers 90 of the fuel cell support members 88 include alumina fiber. Since the insulating plates 86 are interposed between the alumina layers 90 and the stack body 36, it is possible to reliably prevent the alumina layers 90 from absorbing the load in the directions along the separator surface of the stack body 36 by the insulating plates 86.

Further, in the fuel cell stack 70, the insulating plates 86 are made of mica. Therefore, the insulating plates 86 can suitably function as insulating members.

Figure 6:
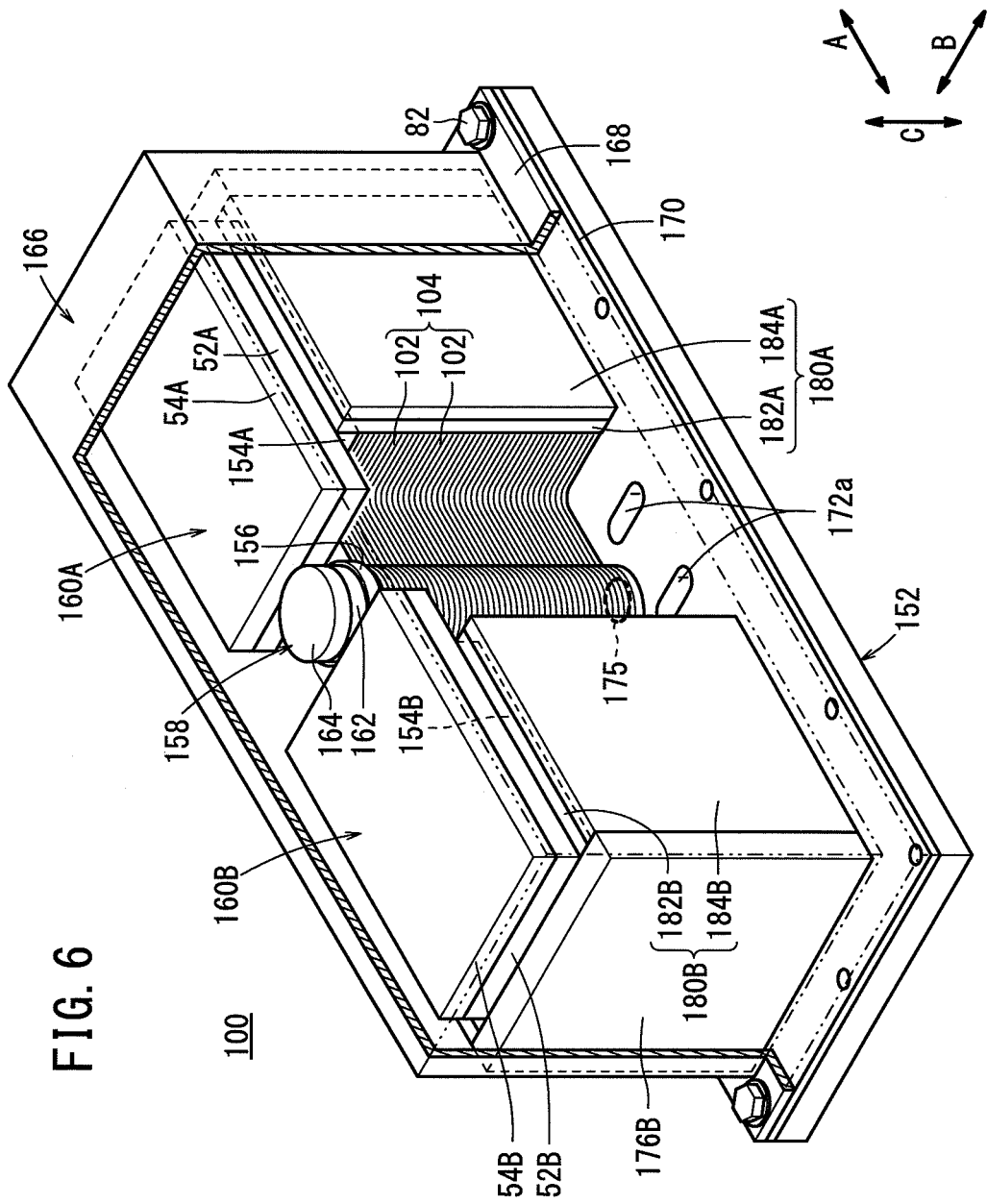
FIG. 6 is a perspective view schematically showing a fuel cell stack according to a third embodiment of the present invention.

FIG. 6 is a perspective view schematically showing a fuel cell stack 100 according to a third embodiment of the present invention.

Figure 7:
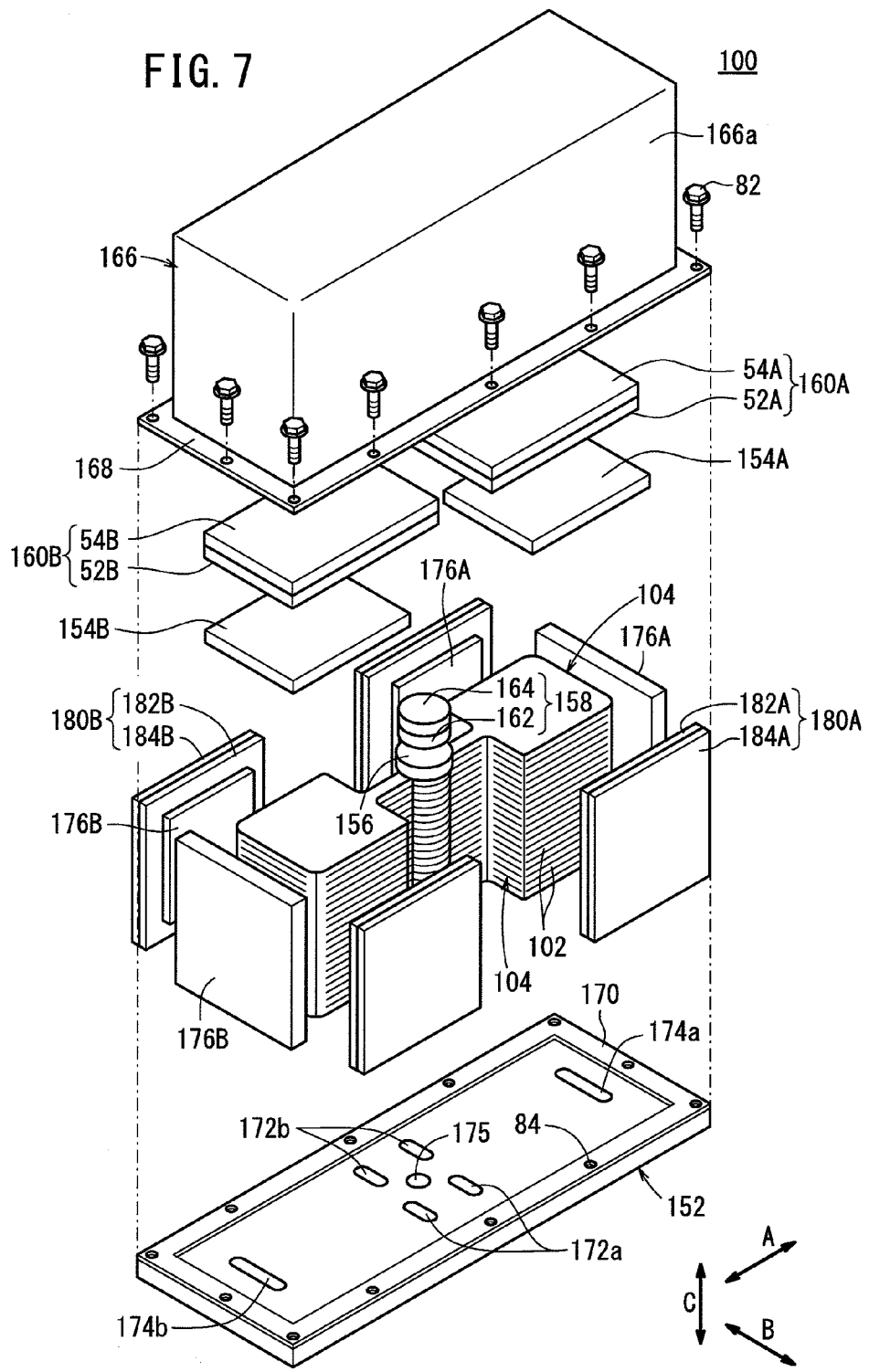
FIG. 7 is a partially-exploded perspective view showing the fuel cell stack.

As shown in FIGS. 6 and 7, the fuel cell stack 100 includes a plurality of solid oxide fuel cells 102 stacked in a direction indicated by an arrow C. A plurality of the solid oxide fuel cells 102 are stacked together to form a stack body 104.

Figure 8:
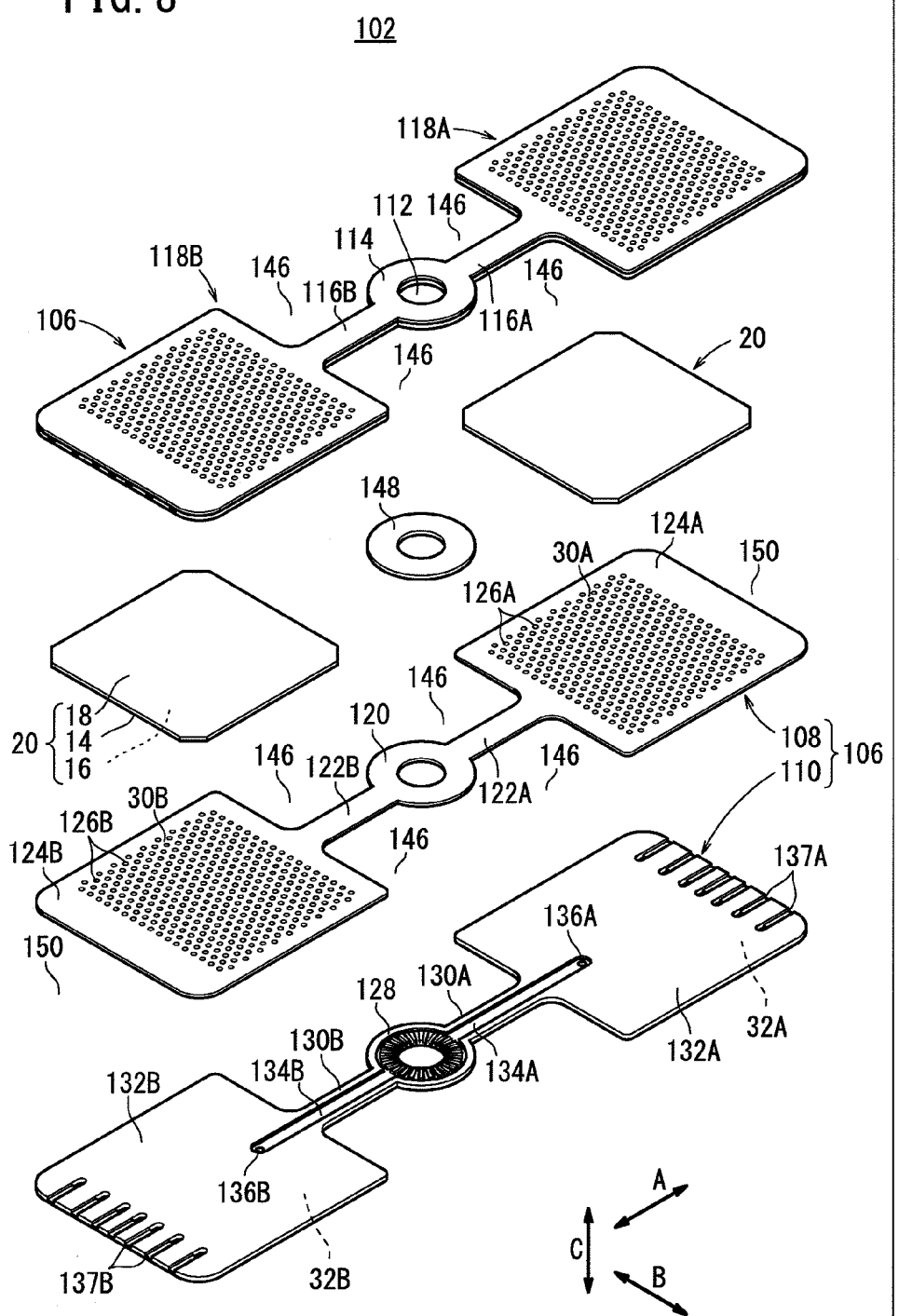
FIG. 8 is an exploded perspective view showing a solid oxide fuel cell of the fuel cell stack.

As shown in FIG. 8, the solid oxide fuel cell 102 includes a pair of separators 106 sandwiching two electrolyte electrode assemblies 20 positioned in the same plane. The separator 106 includes a first plate 108 and a second plate 110. For example, the first plate 108 and the second plate 110 are metal plates of stainless alloy or the like, and are joined to each other, e.g., by brazing, diffusion bonding, or laser welding.

The separator 106 has a fuel gas supply section 114, and a fuel gas supply passage 112 extends through the center of the fuel gas supply section 114. A pair of bridge sections 116A, 116B are connected to the fuel gas supply section 114, and the bridge sections 116A, 116B extend in directions opposite to each other. Sandwiching sections 118A, 118B are provided integrally with the pair of bridge sections 116A, 116B at symmetrical positions with respect to the fuel gas supply section 114 positioned at the center.

The first plate 108 includes a first circular disk 120, and the fuel gas supply passage 112 extends through the first circular disk 120. First long plates 122A, 122B are provided integrally with the first circular disk 120. The first long plates 122A, 122B extend from the first circular disk 120 in directions opposite to each other. First rectangular sections 124A, 124B are provided integrally with the first long plates 122A, 122B. A plurality of protrusions 126A, 126B are formed on surfaces of the first rectangular sections 124A, 124B facing the cathodes 16. Oxygen-containing gas channels 30A, 30B are formed by the protrusions 126A, 126B, respectively.

The second plate 110 has a second circular disk 128, and the fuel gas supply passage 112 extends through the center of the second circular disk 128. Second long plates 130A, 130B are provided integrally with the second circular disk 128, and the second long plates 130A, 130B extend from the second circular disk 128 in directions opposite to each other. Second rectangular sections 132A, 132B are provided integrally with the second long plates 130A, 130B, respectively.

Fuel gas supply channels 134A, 134B are formed to extend from the second long plates 130A, 130B to the second rectangular sections 132A, 132B. Fuel gas inlets 136A, 136B are formed at positions where the fuel gas supply channels 134A, 134B are terminated. A plurality of fuel gas outlets 137A, 137B are formed on surfaces of the second rectangular sections 132A, 132B where the fuel gas supply channels 134A, 134B are formed.

Figure 9:
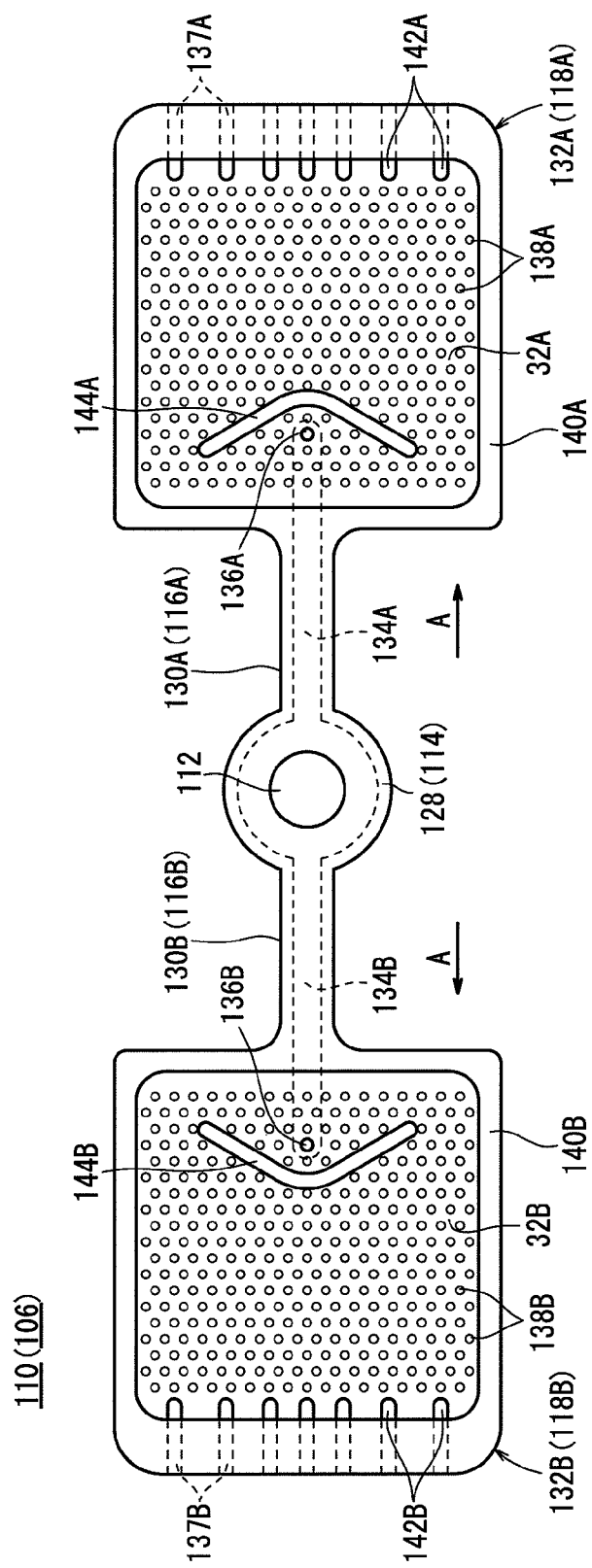
FIG. 9 is a view showing a second plate of the solid oxide fuel cell.

As shown in FIG. 9, a plurality of protrusions 138A, 138B are formed on surfaces of the second rectangular sections 132A, 132B which contact the anodes 18. Fuel gas channels 32A, 32B are formed by the protrusions 138A, 138B. The fuel gas channels 32A, 32B are surrounded by outer protrusions 140A, 140B, and through holes 142A, 142B connected to the fuel gas outlets 137A, 137B are formed in the fuel gas channels 32A, 32B. V-shaped detour path forming walls 144A, 144B are formed between the fuel gas inlets 136A, 136B and the fuel gas outlets 137A, 137B, respectively.

As shown in FIG. 8, oxygen-containing gas supply passages 146 are formed on both sides of the bridge sections 116A, 116B for supplying an oxygen-containing gas in the direction indicated by the arrow C. For example, the oxygen-containing gas flows vertically upward, and the oxygen-containing gas is supplied along the oxygen-containing gas channels 30A, 30B of each solid oxide fuel cell 102 in the direction indicated by the arrow A.

In a pair of separators 106 sandwiching the electrolyte electrode assemblies 20, an insulating seal 148 for sealing the fuel gas supply passage 112 is provided in each space between the fuel gas supply sections 114. For example, mica material, ceramic material or the like, i.e., crustal component material, glass material, and composite material of clay and plastic may be used for the insulating seal 148.

In each solid oxide fuel cell 102, exhaust gas discharge passages 150 are formed around the sandwiching sections 118A, 118B, on the outside in the direction indicated by the arrow A. The fuel gas and the oxygen-containing gas partially consumed in the reaction in the electrolyte electrode assembly 20 are discharged as the exhaust gas from the exhaust gas discharge passages 150 in the stacking direction.

As shown in FIGS. 6 and 7, the fuel cell stack 100 includes a lower end plate 152 provided at a lower end (one end) in the stacking direction of the stack body 104, upper end plates 154A, 154B provided at positions corresponding to the sandwiching sections 118A, 118B, at an upper end (the other end) of the stack body 104 in the stacking direction, and a fuel seal plate 156 provided at a position corresponding to the fuel gas supply section 114.

A first fuel cell support members 158 is placed on the fuel seal plate 156, and second fuel cell support members 160A, 160B are positioned on the upper end plates 154A, 154B. These components form the fuel cell support member as a whole.

The first fuel cell support member 158 includes an alumina layer 162 adjacent to the fuel seal plate 156, and a composite layer 164 stacked on the alumina layer 162. The alumina layer 162 and the composite layer 164 have a circular disk shape corresponding to the fuel seal plate 156.

The second fuel cell support members 160A, 160B include alumina layers 52A, 52B placed on the upper end plates 154A, 154B, and composite layers 54A, 54B stacked on the alumina layers 52A, 52B.

The alumina layers 162, 52A, 52B have structure identical to that of the alumina layer 52. The composite layers 164, 54A, 54B have structure identical to that of the first composite layer 54a.

In comparison with the second fuel cell support members 160A, 160B, for example, the alumina fiber of the first fuel cell support member 158 is compressed to a greater extent, or the density of the alumina fiber of the first fuel cell support member 158 is high in order to apply a larger load in the stacking direction indicated by the arrow C.

The fuel cell stack 100 has a box 166, and a flange 168 is formed at an end of the opening of the box 166, and a seal member 170 is interposed between the flange 168 and the lower end plate 152. The flange 168 and the lower end plate 152 are fixed together using a plurality of bolts 82.

Figure 10:
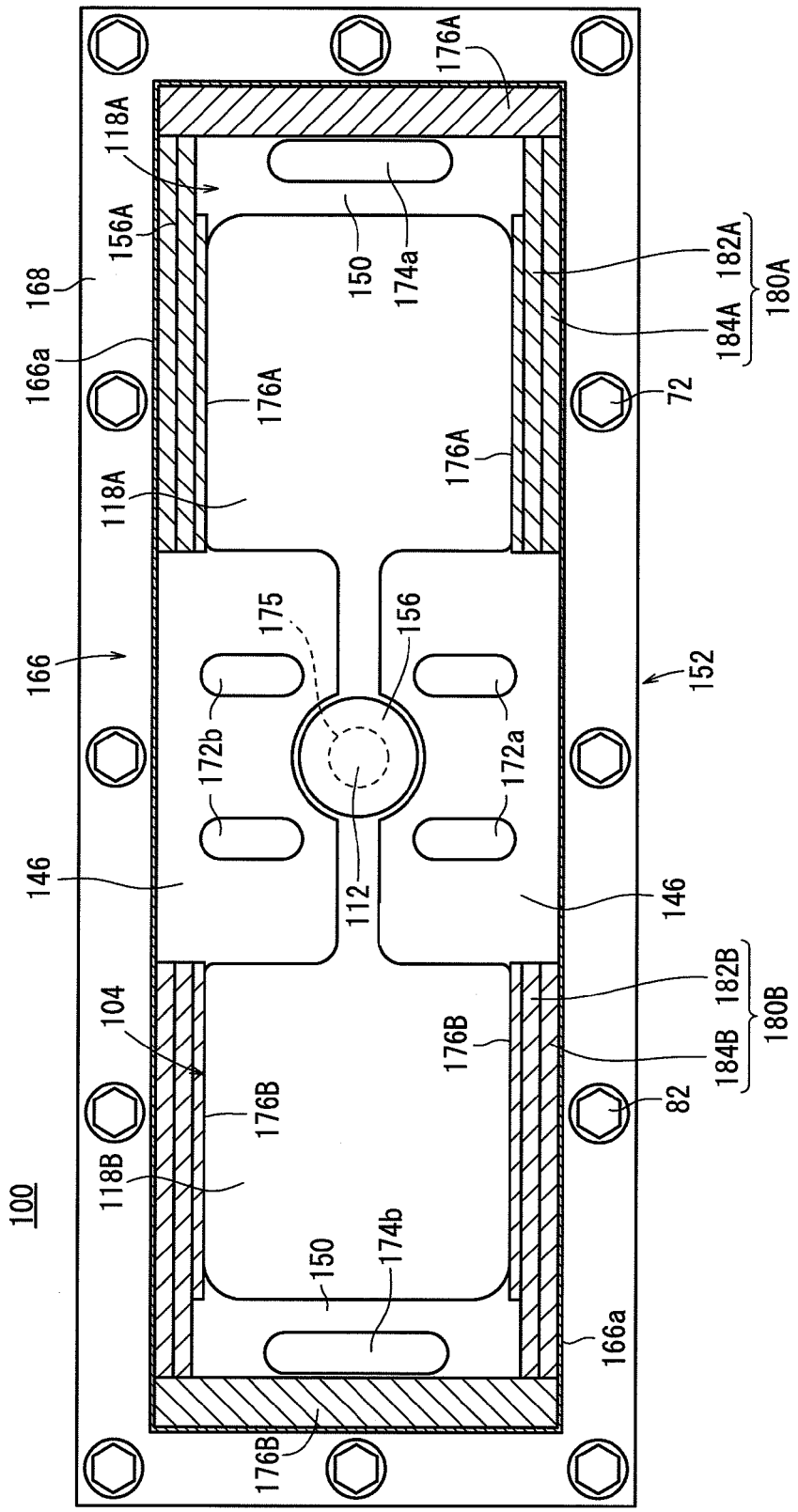
FIG. 10 is a plan view, partially in cross section, showing the fuel cell stack.
Figure 11:
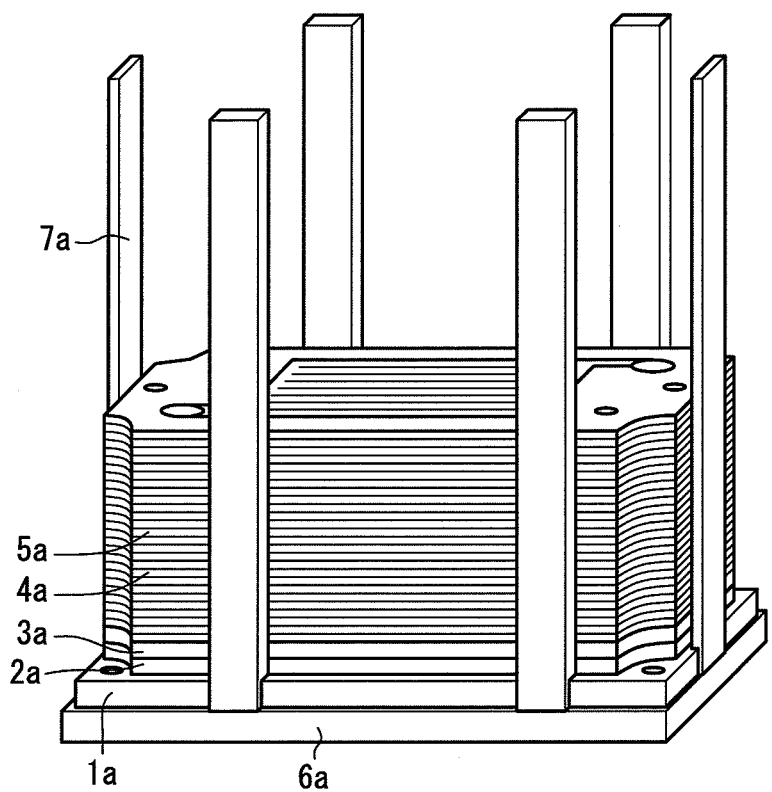
FIG. 11 is a perspective view showing assembling operation of a fuel cell stack disclosed in the conventional technique 1.
Figure 12:
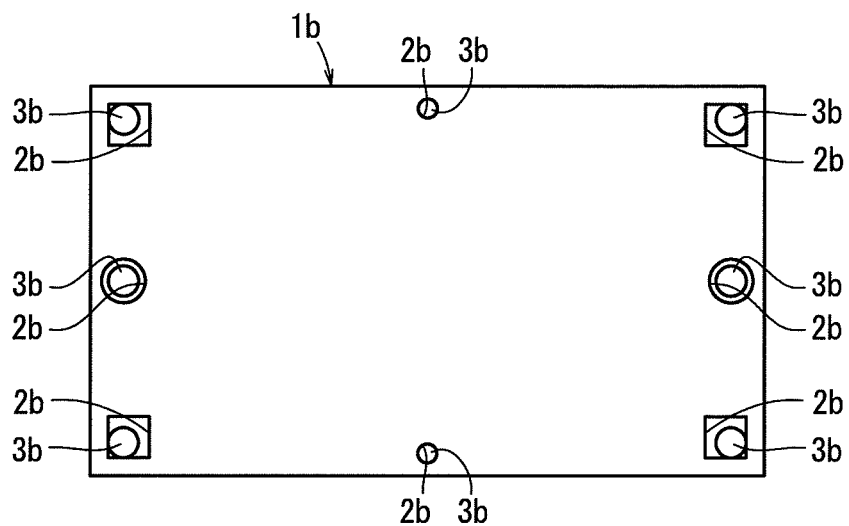
FIG. 12 is a plan view showing a fuel cell disclosed in the conventional technique 2.
Figure 13:
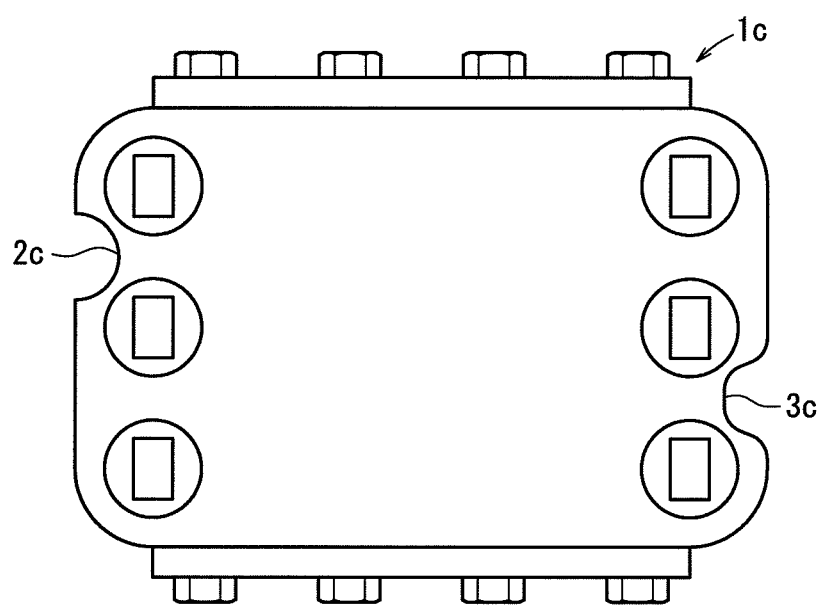
FIG. 13 is a plan view showing a fuel cell disclosed in the conventional technique 3.

As shown in FIG. 10, two air holes 172a and two air holes 172b connected to the oxygen-containing gas supply passage 146, and two exhaust gas holes 174a, 174b connected to the exhaust gas discharge passages 150 are formed in the lower end plate 152. Further, one fuel gas hole 175 connected to the fuel gas supply passage 112 is formed in the lower end plate 152.

As shown in FIGS. 6, 7, and 10, three heat insulating members 176A, 176B are provided between the stack body 104 and the box 166 to cover three sides of the sandwiching sections 118A, 118B. For example, the heat insulating members 176A, 176B are made of heat insulating material such as mica.

Fuel cell support members 180A, 180B are provided along the two parallel surfaces of the sandwiching sections 118A, 118B, between the heat insulating members 176A, 176B and the wall surfaces (walls) 166a of the box 166. The fuel cell support members 180A, 180B include alumina layers 182A, 182B and composite layers 184A, 184B. The alumina layers 182A, 182B are provided adjacent to the sides of the stack body 104, and the composite layers 184A, 184B are provided adjacent to the wall surfaces 166a of the box 166.

Operation of the fuel cell stack 100 will be described below.

A fuel gas is supplied from the fuel gas hole 175 of the lower end plate 152 into the fuel gas supply passage 112 of the fuel cell stack 100. The air is supplied from the air holes 172a, 172b of the lower end plate 152 into the oxygen-containing gas supply passage 146 of the fuel cell stack 100.

As shown in FIG. 8, in the separator 106 of each solid oxide fuel cell 102, the fuel gas supplied to the fuel gas supply passage 112 is supplied into the fuel gas supply channels 134A, 134B formed in the bridge sections 116A, 116B. The fuel gas from the fuel gas supply channels 134A, 134B flows through the fuel gas inlets 136A, 136B into the fuel gas channels 32A, 32B.

As shown in FIG. 9, by the guidance of the detour path forming walls 144A, 144B, the fuel gas supplied to the fuel gas channels 32A, 32B flows through the fuel gas channels 32A, 32B, and the fuel gas is supplied to the anodes 18 of the electrolyte electrode assemblies 20. Then, the fuel gas is discharged into the exhaust gas discharge passages 150 through the fuel gas outlets 137A, 137B.

The air supplied to the oxygen-containing gas supply passages 146 flows into the oxygen-containing gas channels 30A, 30B formed between the cathodes 16 of the electrolyte electrode assemblies 20 and the separator 106. Then, the oxygen-containing gas moves through the oxygen-containing gas channels 30A, 30B in the direction indicated by the arrow A, and supplied to the cathodes 16 of the electrolyte electrode assemblies 20. Then, the oxygen-containing gas is discharged into the exhaust gas discharge passage 150.

In the third embodiment, the fuel cell support members 180A, 180B are provided along the two parallel surfaces of the sandwiching sections 118A, 118B between the heat insulating members 176A, 176B and the wall surfaces 166a of the box 166. The fuel cell support members 180A, 180B include the alumina layers 182A, 182B and the composite layers 184A, 184B.

In the third embodiment, with simple and compact structure, the same advantages as in the case of the first and second embodiments are obtained. For example, the fuel cell stack 100 can be assembled easily, and positional displacement or the like during transportation can be suppressed suitably. Further, it becomes possible to suppress heat radiation, and provide the fuel cell stack 100 which can be operated highly efficiently.

Although certain embodiments of the present invention have been shown and described in detail, it should be understood that various changes and modifications may be made to the embodiments without departing from the scope of the invention as set forth in the appended claims.

The invention claimed is:

1. A fuel cell stack including a stack body formed by stacking a plurality of solid oxide fuel cells in a stacking direction, the solid oxide fuel cells each formed by stacking an electrolyte electrode assembly between separators, the electrolyte electrode assembly including an anode, a cathode, and an electrolyte interposed between the anode and the cathode, the fuel cell stack comprising:
 a wall provided in the stacking direction of the stack body around a side of the stack body; and
 a fuel cell support member comprising an alumina layer made of alumina fiber, and a composite layer made of composite material of alumina fiber and vermiculite, the fuel cell support member being interposed between the wall and the side of the stack body to apply a load to the side of the stack body in a direction of a separator surface,
 wherein the alumina layer is provided adjacent to the side of the stack body, and the composite layer is provided adjacent to the wall.

2. The fuel cell stack according to claim 1, further comprising an insulating member provided between the fuel cell support member and the stack body.

3. The fuel cell stack according to claim 2, wherein the insulating member is made of mica.

4. The fuel cell stack according to claim 1, wherein the solid oxide fuel cell is a flat plate stack solid oxide fuel cell.

* * * * *